Sept. 26, 1933. E. SCHÜRMANN 1,927,851
REVERSING GEAR FOR WASHING MACHINES AND SIMILAR REVERSIBLE MACHINES
Filed March 26, 1930
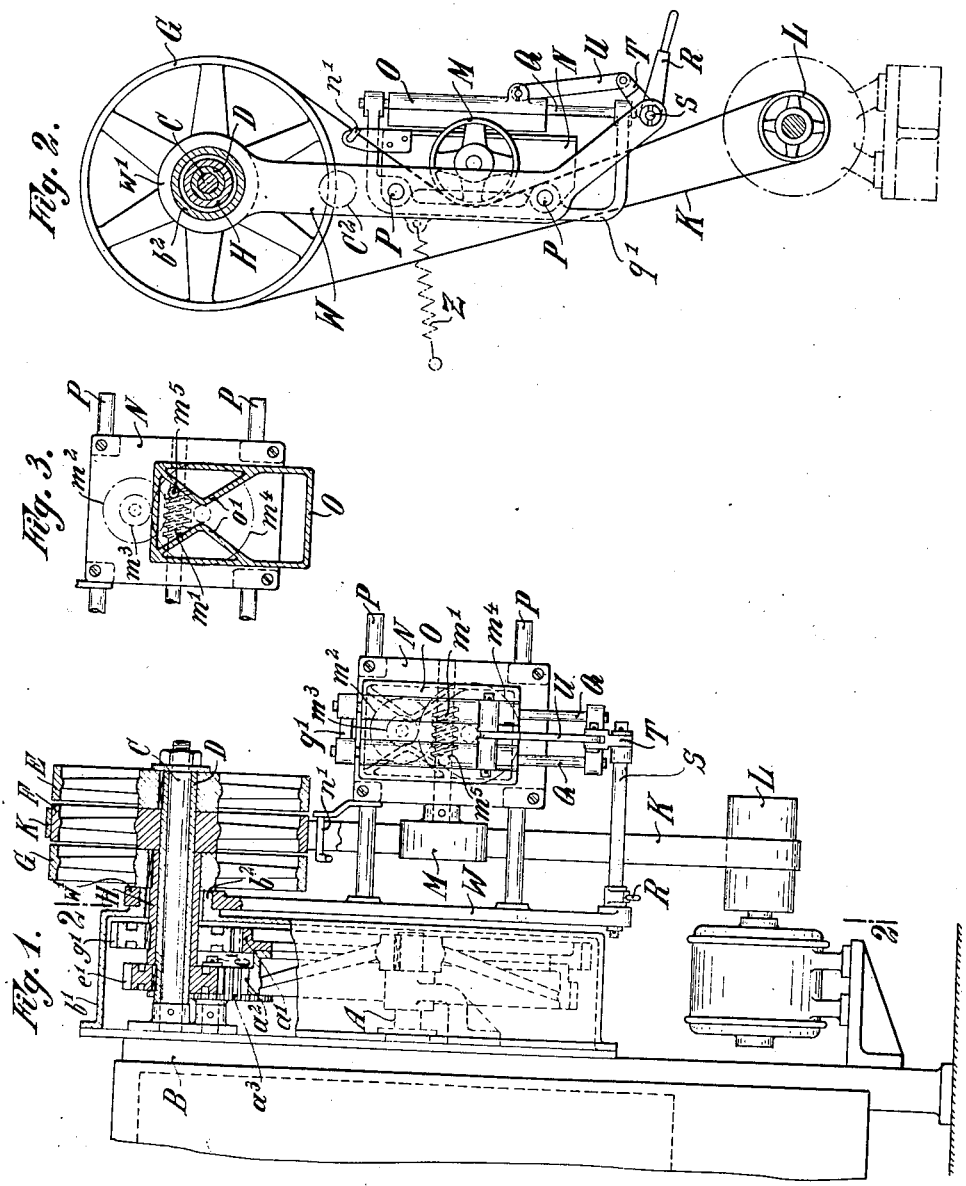

Patented Sept. 26, 1933

1,927,851

UNITED STATES PATENT OFFICE 1,927,851

REVERSING GEAR FOR WASHING MACHINES AND SIMILAR REVERSIBLE MACHINES

Eugen Schürmann, Dusseldorf, Germany

Application March 26, 1930, Serial No. 439,071, and in Germany April 11, 1929

1 Claim. (Cl. 64—4)

My invention relates to those reversing gears for washing machines and similar reversing machines the drive of which is effected by means of one single belt that always runs in the same direction and alternately drives the one or the other of two coaxially arranged pulleys, said pulleys being so positively connected by a reverted wheel system with one another and with the shaft to be reversed of the machine, that both said pulleys rotate in different directions of rotation but at the same speed, the shifting motion of the driving belt from the one to the other driving pulley being effected automatically by means of a shifting mechanism which is actuated by the driving belt itself of the reversing gear which belt drives a driving pulley of the shifting mechanism, this driving pulley taking part in the to and fro shifting motion of the driving belt.

My invention has for its object to permanently impart to the driving belt in a simple and easy manner and entirely automatically the required tension without application of a special belt spanner, which object is obtained substantially by the fact that the shifting mechanism is freely swingingly suspended from a shaft extending in parallelism to that of its driving pulley in such a manner that it is capable of tensioning the belt by gravity.

In order that my invention can be more readily understood, a preferred embodiment of the same is illustrated by way of example in the accompanying drawing as applied to a washing machine. In this drawing Figure 1 is an elevation, partly in vertical and longitudinal section, of the parts concerned of the machine, Figure 2 is a vertical cross section on line 2—2 of Figure 1, seen from the left, and Figure 3 is a detail of the shifting mechanism with some parts in different position.

Referring to this drawing, A denotes the drum shaft to be alternately set in right-hand and left-hand rotation, of a washing machine. A fixed shaft C is freely supported on the mounting of the machine in parallelism to shaft A, on which shaft C is mounted for rotation a tubular shaft D. This shaft D has rigidly fixed on its right-hand end a pulley E and on its left-hand end a pinion $e^1$, whilst beside the pulley E a loose pulley F is rotatably mounted thereon, and besides the latter a pulley G through the intermediary of a tubular shaft H. On the left-hand end of shaft H is fixed a pinion $g^1$. In this manner the pulley E is in rigid connection with pinion $e^1$, and, on the other hand, puley G with pinion $g^1$.

Two spur wheels $a^1$, $a^2$ are rigidly mounted on the free end of the drum shaft A by means of a common wheel star, wheel $a^1$ being directly in mesh with pinion $g^1$ whilst wheel $a^2$ is indirectly in mesh with pinion $e^1$ by means of an intermediate wheel $a^3$ rotatably mounted on a journal $c^1$ fixed on the mounting B of the machine.

The wheels $g^1$ $a^1$ $a^2$ $a^3$ $e^1$ thus form a reverted wheel system the outer wheels of which rotate in inverse direction. Therefore when the pulleys E and G rigidly connected with these two wheels are alternately driven in the same direction of rotation, the drum shaft A has imparted to it in the one case a right-hand rotation and in the other case a left-hand one.

The pulleys E and G are always driven in the same direction of rotation by one and the same open belt K from the motor pulley L, the to and fro shifting motion of belt K being produced automatically by a belt shifting mechanism the driving pulley M of which receives its rotation directly from the very belt K and takes part in the shifting motion of the latter.

The belt shifting mechanism substantially consists of a box-shaped shifting frame N and a casing O located immediately opposite frame N. The latter is adapted to be shifted horizontally on two guide bars P fast on a supporting arm W in parallelism to the gear shaft C, the arm W being swingingly suspended by means of a bearing eye $w^1$ from a cylindrical extension $b^2$ of the casing $b^1$ that includes the above reverted wheel gear, extension $b^2$ being coaxial with shaft C. The casing O can be shifted and fixed on two guide bars Q as described hereinafter. The bars Q are rigidly connected to the guide bars P by means of a bail $q^1$. The shaft carrying the driving pulley of M is mounted for rotation in the lateral walls of M is mounted for rotation in the lateral walls of the shifting frame N the rotation of which pulley is transmitted by a worm $m^1$ to a worm wheel $m^2$ and from the latter by a pinion $m^3$, coaxial therewith, to another pinion $m^4$. This latter pinion carries a crank pin $m^5$ which projects into the casing O and is adapted to engage a guide $o^1$ provided in casing O and having the shape of a crank guide enlarged toward both ends, see best Figure 3.

In the position of rest illustrated in Figure 1, of the described drum shaft driving gear the casing O assumes its upper position in which the walls of the crank guide $o^1$ are out of the orbit of the crank pin $m^5$ so that the rotary motion of the latter has no effect on them. When the device should be thrown into operation, the casing O is shifted into its lower position shown in Figure 3 by means of a hand lever R, a shaft S, an actuating lever T and a rod U and fixed in this position by any suitable fixing means (not shown). In this position of casing O the horizontal middle line of the crank guide $o^1$ coincides with the center of the crank circle of pin $m^5$, and, as casing O is stationary, the rotary motion of pin $m^5$ causes a to and fro shifting motion of the belt-shifting frame N. In this reciprocating motion frame N carries with it a belt shifter $n^1$ which is fixed thereon and alternately puts the belt K on the one or the other of the pulleys E and G. Due to the crank guide $o^1$ being enlarged toward both ends, the shifting motion does not take place continually upon reversal but stepwise, because of the fact that the crank pin $m^5$ then runs idly on a determined section of its orbit before engaging the opposite wall of the crank guide $o^1$. Consequently the respective driving action of each pulley lasts a certain period of time, as the crank pin rotates only at a comparatively low speed.

Owing to the belt shifting mechanism being swingingly suspended its weight exerts a turning moment about the axis it is suspended from by which moment the pulley M is permanently urged onto belt K whereby the latter is automatically kept under the required tension.

Under certain circumstances it may be of advantage with respect to the location of the pulley L of the driving motor to increase the moment exerted by the weight of the controlling mechanism, this being obtained for instance by adequately providing a spring Z, as shown in dot and dash lines in Figure 2. Furthermore, it is not necessary in any case that the supporting arm W is freely suspended coaxially with the pulleys E, G, but this free suspension can be established also from a separate shaft, such as shaft $C^2$ shown in dot and dash lines in Figure 2 which is fixed on the mounting of the machine and extends in parallelism to gear shaft C. This arrangement would afford under circumstances a more favorable utilization of the effect of the weight of the belt shifting mechanism and a reduced structural extension of the gear. In all events my new arrangement affords the possibility of permanently and entirely automatically keeping under tension the driving belt in the simplest possible manner without provision of a special belt spanner, whereby a considerable simplification and reliable operation of the machine is obtained.

What I claim and desire to secure by Letters Patent is:—

In a machine of the class described having a reversing gear with two driving pulleys, a single driving belt adapted to alternately drive one of said pulleys and an automatic belt shifting mechanism including a driving pulley in contact with the driving belt of the reversing gear, the combination of the belt shifting mechanism with a shaft extending in parallelism to the shaft of the driving pulley of said mechanism and an arm freely swingingly pivoted on said first-named shaft, said mechanism being mounted on said arm, the center of gravity of said arm together with the shifting mechanism lying outside a vertical plane going through the pivot-axis of said arm.

EUGEN SCHÜRMANN.